United States Patent [19]

Murphy

[11] Patent Number: 4,483,712

[45] Date of Patent: Nov. 20, 1984

[54] WATER-BORNE LAMINATING INK

[75] Inventor: Patrick N. Murphy, Granite City, Ill.

[73] Assignee: Crown Zellerbach Corporation, San Francisco, Calif.

[21] Appl. No.: 538,080

[22] Filed: Oct. 3, 1983

[51] Int. Cl.³ .............................................. C09D 11/08
[52] U.S. Cl. ....................................... 106/30; 428/497
[58] Field of Search ....................... 106/30, 24, 25, 27; 428/497

[56] References Cited

U.S. PATENT DOCUMENTS

| | | | |
|---|---|---|---|
| 3,682,688 | 8/1972 | Hughes et al. | 106/27 |
| 3,884,707 | 5/1975 | Dick et al. | 106/24 |
| 3,912,675 | 10/1975 | Hoshi et al. | 106/30 |

Primary Examiner—Paul Lieberman
Assistant Examiner—Amelia B. Yarbrough
Attorney, Agent, or Firm—Stanley M. Teigland

[57] ABSTRACT

Water-borne inks containing shellac or copal in combination with a titanium ester chelate have excellent printability and bond strength when used as laminating inks.

9 Claims, No Drawings

WATER-BORNE LAMINATING INK

This invention is a water-borne ink which is especially suitable for use as a laminating ink. A laminating ink is an ink which is printed onto a plastic film which is subsequently laminated to another substrate, usually another plastic film, with the ink being sandwiched between the two substrates. The lamination is effected either by extruding a resin such as polyethylene directly onto the printed surface of the film or by using an adhesive, such as saran or polyurethane, to join the two substrates. In either case, the ink must form an excellent bond between the two substrates because otherwise they would delaminate. The ink must also, of course, have excellent printability on the plastic film. It would be desirable for the ink to be water-borne rather than solvent-borne, but no water-borne laminating ink having acceptable printability and bond strength for unprimed extrusion laminations on polyolefin films was known prior to this invention.

The ink of this invention has excellent printability on plastic film and excellent bond strength when used as a laminating ink. The ink comprises:
(a) a binder comprising shellac or copal,
(b) a volatile component comprising water and a solvent for the binder, with the ratio of water to solvent being at least 1:1,
(c) a base,
(d) a water-reducible titanium ester chelate, and
(e) a colorant.

The ink may also include conventional ink additives, such as antioxidants, biocides, and waxes. The amount of the additives is preferably between about 0 and 5% by weight of the composition of the ink.

The use of shellac and copal in solvent-borne inks used to print plastic film is described in U.S. Pat. No. 3,912,675. U.S. Pat. Nos. 3,884,707 and 3,951,892 disclose the use of shellac in water-borne inks used to print cellulose. However, prior to this invention, neither shellac nor copal had been used successfully in a water-borne laminating ink for polyolefin films because of insufficient bond strength or other problems. In this invention, the bond strength is improved by including in the ink formulation a titanium ester chelate.

The use of titanium ester chelates in solvent-borne inks is disclosed in U.S. Pat. No. 3,682,688. However, as far as is known, titanium ester chelates have not been successfully used in water-borne inks prior to this invention.

Chelates suitable for use in this invention include those disclosed in U.S. Pat. No. 3,682,688 that are water reducible, i.e., can be reduced in concentration (i.e., diluted) with water, and are sufficiently stable in water to provide an ink having a stability of at least two months. The chelates disclosed in U.S. Pat. No. 3,682,688 have the formula

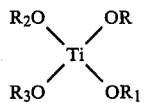

wherein R and $R_1$ are $C_2$-$C_{10}$ aliphatic hydrocarbyl groups substituted with at least one electron donor group chosen from —OH, —NH$_2$, substituted amino or $>$C$=$O, and $R_2$ and $R_3$ are chosen from the same group as R and $R_1$ plus —H and $C_2$-$C_8$ alkyl. Some chelates, such as titanium acetylacetonate, which is commonly used in solvent-borne inks, and the chelate prepared from lactic acid (Example 3 of U.S. Pat. No. 3,682,688) are not sufficiently stable in water. The water reducibility of chelates and their stability in water can be determined by routine experimentation. The preferred chelate is titanium triethanolamine chelate. The concentration of the titanium ester chelate is preferably from about one to five percent by weight of the ink.

According to U.S. Pat. No. 3,682,698, the chelate crosslinks resins containing active hydrogen groups. This suggests, in view of this invention, that other compounds capable of crosslinking shellac or copal under conditions of extrusion lamination may be used in place of the titanium ester chelate. Such other compounds may include other water-reducible metal (e.g. zirconium) esters stable in water, or acids or compounds, such as borax, which generate an acid under conditions of extrusion lamination.

The binder, which may contain resins other than shellac or copal, preferably constitutes from about 10 to 25% of the ink. Preferably at least half, more preferably at least 75%, of the binder comprises shellac or copal. The binder preferably comprises a mixture of shellac and copal, with the ratio of shellac to copal preferably being from about 1:1 to 2:1. Shellac typically has a melting point range of about 77° to 80° C. and an acid number of about 65 to 75. Copal has a melting point range of about 114° to 125° C. and an acid number of 110 to 114. A mixture having a ratio of shellac to copal between 2:1 and 1:1 has a melting point between about 90° and 110° C. and an acid number of 95 to 125. The mixture is preferably formed by dissolving the resins, preferably with alkali, and coprecipitating them, preferably with a mineral acid such as sulfuric acid if they were dissolved with alkali. In view of this invention, a synthetic resin having properties (such as molecular weight, hydroxyl functionality and acid number) essentially similar to shellac or copal might be substituted for all or part of the shellac or copal.

The volatile component of the ink preferably constitutes from about 30 to 70 percent by weight of the ink, with the ratio of water to solvent in the volatile component preferably being at least 3:1. Suitable solvents include lower alcohols, such as methanol, ethanol, isopropanol and n-propanol, with isopropanol being preferred.

The base is preferably also volatile. Suitable bases include ammonia and lower alkyl and alkanol amines, such as diethylamine and diethanolamine. The base is preferably present in an amount of between about two and ten percent by weight of the ink.

The colorant, which may be a pigment or a dye, preferably constitutes from about two to fifty percent by weight of the ink. Any of the colorants conventionally used in water-borne inks may be used in the ink of this invention.

The ink of this invention is especially suitable for printing on polyolefin, particularly oriented polypropylene, film using a rotogravure or flexographic press. When the printed film is laminated to another substrate, the ink provides excellent bond strength. The bond strength is at least 200 grams per inch (as measured with a conventional bond tester, such as an Amthor or Instron bond tester) when the ink is applied to an entire surface of an oriented polypropylene film which has been corona treated to a surface energy of 42 dynes/cm, and the film is laminated to a substrate having a polyethylene surface in contact with the ink. As used herein, the term "bond strength" refers to the bond strength measured in accordance with the method described in this paragraph.

The ink of this invention is prepared generally in accordance with conventional methods. First a vehicle is prepared by dissolving the binder in the volatile component, which may contain additives if desired. The colorant is then dispersed in a portion of the vehicle. The dispersion is blended with the remainder of the vehicle together with the titanium ester chelate and other additives, if desired. Additional volatile component may be added to the ink to adjust for proper viscosity.

Inks were prepared as described above from the formulations given in the following Examples. The stability of the inks and their printability and bond strengths under laboratory and commercial conditions were determined. The results are reported in the Table. Printability was determined by examining the printed film for the presence of streaks or other defects, with a score of 10 indicating excellent printability. In each Example in which a shellac-copal mixture was used, the mixture was prepared by coprecipitation.

EXAMPLE 1

| 1:1 Shellac-Copal Mixture | 18.0% |
|---|---|
| Titanium Dioxide (Pigment) | 30.0% |
| Isopropanol | 8.5% |
| Water | 36.9% |
| Ammonia (26° Baume) | 2.6% |
| Triethanolamine Titanate | 3.0% |
| Dimethylaminoethanol | 1.0% |

COMPARATIVE EXAMPLE A

Example 1 was repeated substituting water for the titanate.

EXAMPLE 2

| 2:1 Shellac-Copal Mixture | 18.0% |
|---|---|
| Titanium Dioxide | 30.0% |
| Isopropanol | 8.5% |
| Water | 36.9% |
| Ammonia | 2.6% |
| Triethanolamine Titanate | 3.0% |
| Dimethylaminoethanol | 1.0% |

COMPARATIVE EXAMPLE B

Example 2 was repeated substituting water for the titanate.

EXAMPLE 3

| Shellac | 18.0% |
|---|---|
| Titanium Dioxide | 30.0% |
| Isopropanol | 8.5% |
| Water | 36.9% |
| Ammonia | 2.6% |
| Triethanolamine Titanate | 3.0% |
| Dimethylaminoethanol | 1.0% |

COMPARATIVE EXAMPLE C

Example 3 was repeated substituting water for the titanate.

EXAMPLE 4

| Rosin Maleic Anhydride Ester Resin | 4.5% |
|---|---|
| Borax-Modified Bleached Shellac | 13.5% |
| Titanium Dioxide | 30.0% |
| Isopropanol | 8.5% |
| Water | 36.9% |
| Ammonia | 2.6% |
| Triethanolamine Titanate | 3.0% |
| Dimethylaminoethanol | 1.0% |

COMPARATIVE EXAMPLE D

Example 4 was repeated substituting water for the titanate.

EXAMPLE 5

| 2:1 Shellac-Copal Mixture | 21.0% |
|---|---|
| Phthalocyamine Blue | 12.8% |
| Isopropanol | 11.0% |
| Water | 48.6% |
| Ammonia | 2.6% |
| Triethanolamine Titanate | 3.0% |
| Dimethylaminoethanol | 1.0% |

COMPARATIVE EXAMPLE E

Example 5 was repeated substituting water for the titanate.

COMPARATIVE EXAMPLE F

| Acrylic Resin (Joncryl 67 - S.C. Johnson) | 9.0% |
|---|---|
| Acrylic Emulsion (Joncryl 74F - S.C. Johnson) | 9.0% |
| Titanium Dioxide | 30.0% |
| Isopropanol | 8.5% |
| Water | 37.5% |
| Ammonia | 3.0% |
| Triethanolamine Titanate | 3.0% |

COMPARATIVE EXAMPLE G

| Rosin Maleic Anhydride Ester Resin | 18.0% |
|---|---|
| Titanium Dioxide | 30.0% |
| Isopropanol | 8.5% |
| Water | 35.7% |
| Ammonia | 4.8% |
| Triethanolamine Titanate | 3.0% |

COMPARATIVE EXAMPLE H

| Polyamide Resin | 18.0% |
|---|---|
| Titanium Dioxide | 30.0% |
| Isopropanol | 18.5% |
| Water | 28.0% |
| Ammonia | 1.5% |
| Dimethylethanolamine | 1.0% |
| Triethanolamine Titanate | 3.0% |

COMPARATIVE EXAMPLE I

| Rosin Maleic Anhydride Ester Resin | 4.5% |
|---|---|
| Reactive Acrylic Emulsion | 13.5% |

-continued

| Isopropanol | 8.5% |
| Water | 39.0% |
| Ammonia | 1.5% |
| Pigment | 30.0% |
| Triethanolamine Titanate | 3.0% |

TABLE

| Example | Printability Laboratory | Printability Commercial | 2 Months Stability | Bond Strength Laboratory | Bond Strength Commercial |
| --- | --- | --- | --- | --- | --- |
| 1 | 10 | 10 | OK | 400+ | 300+ |
| 2 | 10 | 10 | OK | 400+ | 280 |
| 3 | 6 | Not Run | Doubles Visc. | 400+ | Not Run |
| 4 | 8 | Not Run | OK | 250 | Not Run |
| 5 | 10 | 10 | OK | 250 | 200 |
| A | 10 | Not Run | OK | 150 | Not Run |
| B | 10 | Not Run | OK | 150 | Not Run |
| C | 6 | Not Run | OK | 250 | Not Run |
| D | 8 | Not Run | OK | 200 | Not Run |
| E | 10 | Not Run | OK | 150 | Not Run |
| F | 8 | 8 | OK | 0 | 30-50 |
| G | 10 | 10 | OK | 50 | 50 |
| H | 10 | Not Run | OK | 0 | Not Run |
| I | 2 | Not Run | Gels - 2 Days | 250 | Not Run |

These examples show that the inks of this invention have excellent properties as laminating inks, including good stability and printability and excellent bond strength. The superior properties are due to the interactive combination of the binder and the chelate in a water-borne system. The comparative examples show that water-borne inks not containing both a titanium ester chelate and shellac or copal do not have both good printability and good bond strength.

I claim:
1. An ink comprising:
   (a) a binder comprising shellac or copal,
   (b) a volatile component comprising water and a solvent for the binder, with the ratio of water to solvent being at least 1:1,
   (c) a base,
   (d) a water-reducible titanium ester chelate, and
   (e) a colorant.
2. The ink of claim 1 wherein the binder is a mixture of shellac and copal.
3. The ink of claim 2 wherein the mixture is formed by coprecipitation.
4. The ink of claim 1 wherein the ratio of water to solvent is at least 3:1.
5. The ink of claim 1 wherein the base is selected from the group consisting of ammonia and volatile amines.
6. The ink of claim 1 wherein the titanium chelate has the formula:

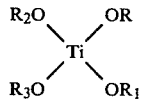

wherein R and $R_1$ are $C_2$-$C_{10}$ aliphatic hydrocarbyl groups substituted with at least one electron donor group chosen from —OH, —$NH_2$, substituted amino or C═O, and $R_2$ and $R_3$ are chosen from the same group as R and $R_1$ plus —H and $C_2$-$C_8$ alkyl.

7. The ink of claim 1 having a bond strength of at least 200 grams per inch.
8. Plastic film printed with the ink of claim 1 and laminated to another substrate, with the ink being sandwiched between the film and the substrate.
9. In an ink comprising a binder, a colorant, a base and a volatile component comprising water and a solvent for the binder, with the ratio of water to solvent being at least 1:1, the improvement wherein the binder comprises shellac or copal and the ink includes a bond-improving compound which is a water-reducible titanium ester chelate stable in water.

* * * * *